W. MARKS & G. JESSUP.
Feed-Cup for Fertilizer-Distributers.
No. 217,628. Patented July 15, 1879.
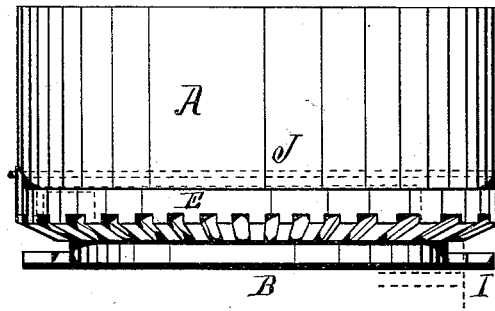
Fig. 1.
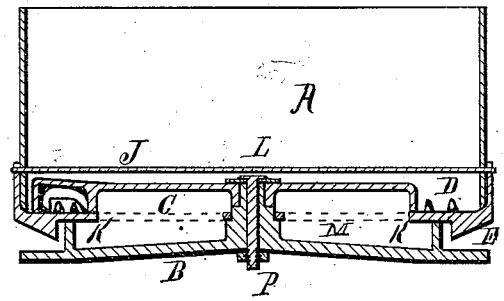
Fig. 2.
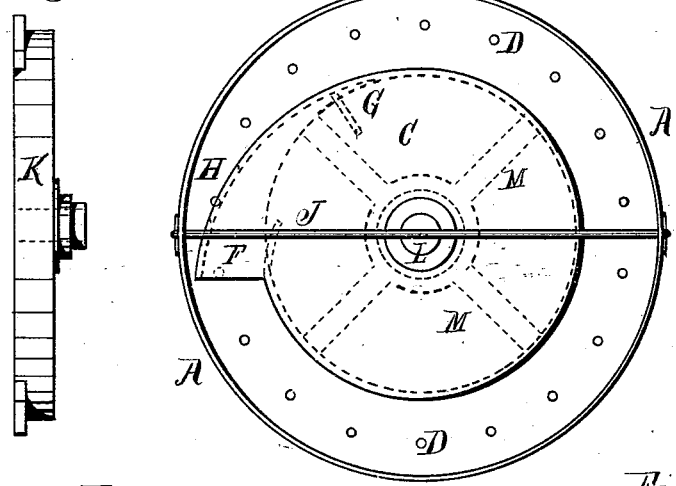
Fig. 3.
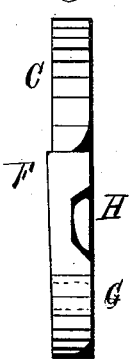
Fig. 7.
Fig. 6
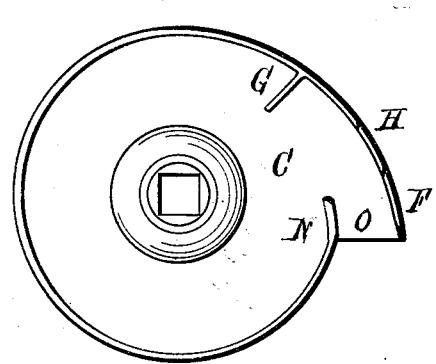
Fig. 4.
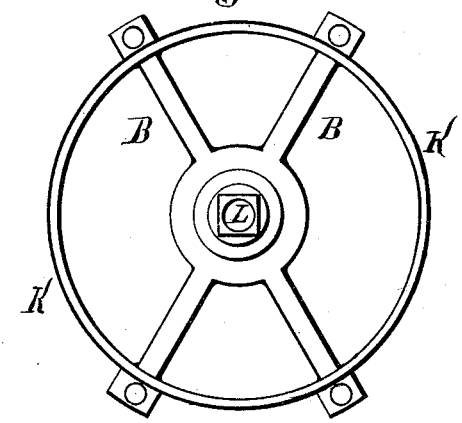
Fig. 5.
Witnesses
W. M. Rebasz Jr.
W. H. Engkhardt
Inventors
W. Marks,
G. Jessup,
by G. B. Selden, atty.
N. PETERS, PHOTO-LITHOGRAPHER, WASHINGTON, D. C.

UNITED STATES PATENT OFFICE.

WALTER MARKS AND GILBERT JESSUP, OF HOPEWELL, NEW YORK; SAID JESSUP ASSIGNOR TO SAID MARKS.

IMPROVEMENT IN FEED-CUPS FOR FERTILIZER-DISTRIBUTERS.

Specification forming part of Letters Patent No. 217,628, dated July 15, 1879; application filed April 29, 1879.

*To all whom it may concern:*

Be it known that we, WALTER MARKS and GILBERT JESSUP, residents of Hopewell, Ontario county, New York, have jointly invented an Improved Feed-Cup for Fertilizer-Distributers, of which the following is a specification.

Our present invention relates to an improvement on our Patent No. 213,053.

It consists in the combination, with a rotary feed-cup having an annular row of pins projecting upward from its bottom, and provided with a central discharge-orifice, of a stationary feeding-shell, constructed to distribute the fertilizer through the center of the feed-cup, as hereinafter more fully set forth.

It also consists in the combination, with the parts last-mentioned, of a rotating distributer placed within the cup and operating to feed the fertilizer into the shell.

It also consists in the combination of the said parts with a suitable supporting-frame having a central pivot on which the feed-cup rotates, and in the construction and arrangement of the feeding-shell.

Our improved feed-cup is represented in the acompanying drawings, in which—

Figure 1 is a side elevation; Fig. 2, a central vertical section; Fig. 3, a plan view, showing the annular row of pins and the feeding-shell. Fig. 4 is a view of the feeding-shell as seen from beneath. Fig. 5 is a plan view of the supporting-frame; Fig. 6, a side view of the same; and Fig. 7, a side view of the feeding-shell.

In the accompanying drawings, A is the rotating feed-cup, which is provided with a bevel-gear, E, on its lower edge.

The feed-cup A may be made entirely of cast-iron; but we prefer, for the sake of lightness, to construct the vertical sides of the same of sheet metal. This is the construction represented in the drawings, Figs. 1 and 2, in which the sheet-metal shell of the feed-cup is represented as entering within an annular rim projecting upward from the cast bevel E.

The sheet-metal shell A is attached to the bevel-gear E by a rod, J, passing through suitable lugs on the latter, and which rod also acts as a distributer to feed the fertilizer into the shell G.

An opening is made through the bottom of the feed-cup, as represented in the dotted lines in Figs. 2 and 3. The feed-cup is supported on the pivot L of the frame B by means of the arms M M, Fig. 3.

The supporting-frame B is provided with a circular rim, K, Figs. 2 and 5, upon which the bottom of the feed-cup bears inside the bevel E. The fertilizer is thus prevented from escaping outside, but is caused to pass downward between the arms of the supporting-frame.

Provision is made for rotating the feed-cup by means of a horizontal shaft passing underneath the same and provided with a pinion, I, Fig. 1, which meshes with the gear E.

Inside the rotating feed-cup, and attached to the pivot L, is placed the stationary feeding-shell C. The feeding-shell C consists of a shallow circular cup, placed with its opening downward, and provided on one side with a projecting lip, F. The flange or rim surrounding the shell extends outward to the point of the lip F; but an open space, O, Fig. 4, is left between the lip F and the circular portion of the flange N.

An annular series of pins, D, project upward from the bottom of the feed-cup at such a distance from the center of rotation that they will pass through the open space O and a notch, H, in the flange of the lip F.

Inside the feeding-shell, and where the lip F joins the circular rim thereof, is placed a clearing-plate, G, the object of which is to discharge the fertilizer which has been brought into the lip F by the rotation of the pins D through the central opening in the bottom of the feed-cup.

The feed-shell C may be attached to the supporting-frame B in any convenient manner. In the construction represented in the drawings the upper end of the pivot L is made square, and there is an opening of corresponding shape in the center of the feeding-shell. A bolt, P, Fig. 2, passes through both the feeding-shell and the pivot L, and secures them together.

From the preceding description, the operation of our improved fertilizer-distributer will be readily understood. The fertilizer, fed into the rotating feed-cup A, is thoroughly stirred around and distributed by the rod J, and is caused to pass into the opening in the lip F of the feeding-shell C by the rotation of the feed-cup, assisted by the series of pins D. From the feeding-shell C the fertilizer passes downward between the arms M of the feed-cup and through the openings between the arms of the supporting-frame B. A suitable hopper should be placed over the feed-cups, the said hopper being provided on its lower side with openings in which the feed-cup rotates, with or without a protecting-flange, as described in our previous patent.

It is obvious that the feeding-shell C may be rotated within the feed-cup without any material departure from the principle of our invention. In this case the feed-cup may be itself either stationary or rotating, and the feeding-shell may have the form on its upper side of a cone, and it may be used either with or without the circular row of pins.

We claim—

1. The combination of the feeding-shell C, having projecting lip F, and feed-cup A, provided with a central discharge-opening, and supported by the open frame B, having rim K, substantially as described.

2. The circular feeding-shell C, provided with projecting lip F, in combination with a feed-cup having a central discharge-opening, substantially as set forth.

3. The combination of the rotating feed-cup A, provided with pins D and a central discharge-opening, and the feeding-shell C, having projecting lip F, substantially as described.

4. The combination of the feed-cup A, provided with a central discharge-opening, and the distributer J, and the feeding-shell C, substantially as described.

5. The combination of the supporting-frame B, having circular rim K, the rotating feed-cup A, provided with a central discharge-opening, and the feeding-shell C, substantially as set forth.

6. The circular feeding-shell C, provided with projecting lip F, having notch H, substantially as described.

7. The circular feeding-shell C, having projecting lip F and clearing-plate G, substantially as described.

WALTER MARKS.
GILBERT JESSUP.

Witnesses:
S. G. PETTIT,
W. F. MARKS.